United States Patent [19]

Fu et al.

[11] Patent Number: 5,192,724
[45] Date of Patent: Mar. 9, 1993

[54] REACTIVATION OF SPENT CRACKING CATALYSTS

[75] Inventors: Chia-Min Fu; Michael K. Maholland, both of Bartlesville, Okla.

[73] Assignee: Phillips Petroleum Company, Bartlesville, Okla.

[21] Appl. No.: 852,475

[22] Filed: Mar. 17, 1992

[51] Int. Cl.$^5$ .................. B01J 29/38; B01J 38/62; C10G 11/05

[52] U.S. Cl. .................. 502/28; 208/52 CT; 208/120; 502/516; 502/521

[58] Field of Search .................. 502/28, 27, 25, 516, 502/521; 208/52 CT

[56] References Cited

U.S. PATENT DOCUMENTS

| | | | |
|---|---|---|---|
| 2,380,731 | 7/1945 | Drake et al. | 502/28 |
| 3,020,239 | 2/1962 | Flinn et al. | 502/28 |
| 4,255,287 | 3/1981 | Bertus et al. | 252/455 Z |
| 4,321,128 | 3/1982 | Yoo et al. | 208/114 |
| 4,321,129 | 3/1982 | Bertus et al. | 208/120 |
| 4,324,648 | 4/1982 | Roberts et al. | 502/521 |
| 4,377,494 | 3/1983 | Bertus et al. | 252/411 R |
| 4,473,463 | 9/1984 | Bertus et al. | 208/120 |
| 4,595,686 | 6/1986 | Ganguli | 502/26 |
| 4,824,814 | 4/1989 | Elvin et al. | 502/521 |
| 4,830,997 | 5/1989 | Trinh et al. | 502/28 |
| 4,935,121 | 6/1990 | Fu et al. | 208/120 |
| 4,954,244 | 9/1990 | Fu et al. | 208/120 |
| 5,021,377 | 6/1991 | Maholland et al. | 502/26 |
| 5,141,904 | 8/1992 | Kubicek et al. | 502/28 |

OTHER PUBLICATIONS

"Technique for Removing Metal Contaminants From Catalysts", by H. Beuther et al., I&EC Product Research and Development, vol. 2, Mar. 1963, pp. 53–57.

*Primary Examiner*—Paul E. Konopka
*Attorney, Agent, or Firm*—K. K. Brandes

[57] ABSTRACT

A spent metal contaminated zeolite-containing catalytic cracking catalyst composition is reactivated by a process which comprises contacting with (a) dissolved lactic acid and either (b1) at least one dissolved calcium compound or, alternatively, (b2) at least one dissolved tin compound and at least one dissolved phosphorus compound.

21 Claims, No Drawings

REACTIVATION OF SPENT CRACKING CATALYSTS

BACKGROUND OF THE INVENTION

This invention relates to a method of reactivating spent, metal-contaminated zeolite-containing catalytic cracking catalysts. In another aspect, this invention relates to the use of a reactivated spent catalytic cracking catalyst in a catalytic cracking process.

Various methods of rejuvenating deactivated, metal-contaminated zeolite-containing catalytic cracking catalysts are known, such as treatment with ammonium compounds and fluorine compounds, described in U.S. Pat. Nos. 5,021,377, 4,954,244 and 4,935,121. However, there is an ever present need to develop new, effective catalyst reactivation processes.

SUMMARY OF THE INVENTION

It is an object of this invention to provide a process for treating a spent, metal-contaminated zeolite-containing catalytic cracking catalyst composition under such conditions as to enhance its catalytic cracking activity and to alleviate its tendency of generating hydrogen during catalytic cracking. It is another object of this invention to provide a reactivated zeolite-containing catalytic cracking catalyst composition. It is another object of this invention to employ a reactivated spent catalytic cracking catalyst composition in a catalytic cracking process. Other objects and advantages will become apparent from the detailed description of the invention and the appended claims.

According to this invention, a process for reactivating a spent cracking catalyst composition comprises the step of contacting a spent zeolite-containing catalytic cracking catalyst composition which contains at least one metal contaminant with (a) dissolved lactic acid and (b1) at least one dissolved calcium compound or, alternatively, (b2) at least one dissolved tin compound plus at least one dissolved phosphorus compound, wherein said catalyst reactivation process is carried out under such conditions as to obtain a reactivated catalytic cracking catalyst composition exhibiting lower hydrogen generation, when employed in catalytic cracking of a hydrocarbon-containing oil, than said spent zeolite-containing catalytic cracking catalyst composition, and wherein agents (a), (b1) and (b2) are essentially free of antimony, bismuth fluorine (either in elemental form or as compounds).

In a preferred embodiment, the reactivation process of this invention is carried sequentially: first with (a) and then with either (b1) or (b2). In another (presently less preferred) embodiment of this invention, the treatment with (a) and either (b1) or (b2) is carried out substantially simultaneously.

The reactivated spent cracking catalyst composition which is obtained by the reactivation process of this invention can be employed in the catalytic cracking of hydrocarbon-containing oils.

DETAILED DESCRIPTION OF THE INVENTION

The term "catalytic cracking", as used herein, implies that essentially no hydrocracking occurs and that the catalytic cracking process is carried out with a hydrocarbon-containing oil substantially in the absence of added hydrogen gas. Hydrogen generation is measured in a test for catalytically cracking a heavy hydrocarbon-containing oil, being carried out substantially in accordance with the procedure of Example II of U.S. Pat. No. 4,794,095. The term "spent", as used herein, implies that at least a portion of the zeolite-containing catalyst composition employed in the reactivation process of this invention has previously been used in a process for catalytically cracking hydrocarbon-containing oils, in particular those containing metal (Ni, V, Cu) impurities, and has thereby lost some of its catalytic activity. The spent catalytic cracking catalyst composition has been regenerated by stripping of adhered oil from the catalyst (such as by steam-stripping) and subsequent heating in an oxidizing gas atmosphere (such as air) so as to burn off coke deposits on the spent catalyst composition, before the reactivation process of this invention is carried out.

Any spent zeolite-containing catalyst composition, which contains at least one metal contaminant and at least a portion of which has previously been used in a catalytic cracking process, can be used as the starting material in the reactivation process of this invention. The spent catalyst composition can contain any portion of such regenerated catalyst composition, ranging from 100% to about 10 weight-% (i.e., containing 0% to about 90 weight-% fresh, unused zeolite-containing catalytic cracking catalyst composition). The term "spent catalyst composition" encompasses equilibrium cracking catalysts, which are commonly employed in commercial catalytic cracking operations and generally comprise a physical blend of generated used catalyst composition and fresh (unused) cracking catalyst composition. An equilibrium catalyst generally comprises a mixture of catalyst particles of various ages, i.e., a portion of the equilibrium catalyst particles has passed through a varying number of cracking and generation cycles, while a small portion of the equilibrium catalyst particles is fresh (unused) cracking catalyst composition.

The zeolite component of the spent zeolite-containing catalytic cracking catalyst composition of this invention can be any natural or synthetic crystalline aluminosilicate zeolite which exhibits cracking activity. Non-limiting examples of such zeolites are faujasite, chabazite, mordenite, offretite, erionite, Zeolon, zeolite X, zeolite Y, zeolite L, zeolite ZSM-4, zeolite ZSM-5, zeolite ZSM-11, zeolite ZSM-12, zeolite ZSM-23, zeolite ZSM-35, zeolite ZSM-38, zeolite ZSM-48, and the like, and mixtures thereof. Additional examples of suitable zeolites are listed in U.S. Pat. No. 4,158,621. The term "zeolite", as used herein, includes zeolites which have been pretreated, such as those from which a portion of aluminum has been removed from the crystalline framework, and zeolites which have been ion-exchanged with rare earth metal or ammonium or by other conventional ion-exchange methods. The term "zeolite", as used herein, also includes essentially aluminum-free silica polymorphs, such as silicalite, chromia silicates, ferrosilicates, borosilicates, and the like, as disclosed in U.S. Pat. No. 4,556,749.

Generally, the zeolite component of the spent cracking catalyst composition is dispersed in a suitable solid refractory inorganic matrix material, such as alumina, silica, silica-alumina (presently preferred), aluminum phosphate, magnesium oxide, mixtures of two or more of the above-listed materials, and the like. The preparation of such zeolite/matrix cracking catalyst compositions is well known and is not a critical feature of this invention. Generally, the surface area (measured by nitrogen adsorption, substantially in accordance with the BET method of Brunauer, Emmett and Teller) of the spent zeolite/matrix cracking catalyst composition used in step (a) is in the range of from about 100 to 800 m$^2$/g. Generally, the weight ratio of zeolite to matrix material in the spent cracking catalyst composition is in the range of from about 1:20 to about 1:1.

The spent zeolite-containing cracking catalyst composition employed in the reactivation process of the invention contains metal compounds as contaminants (generally as oxides), such as compounds (particularly oxides) of Ni, V, Fe, and Cu, and the like, in particular Ni and V. Contaminants of each metal can generally be present in amounts ranging from traces (about 0.01 weight-%) to about 2.0 weight-% of each contaminant metal, expressed as metal oxide. These impurities in the spent cracking catalyst compositions have generally been absorbed from the oil feed in a previous cracking process. However, the origin of these metal impurities is not believed to be a critical feature of this invention. It is within the scope of this invention to use spent cracking catalysts from which at least a portion of contaminant metals (Ni, V, Cu) have been removed (e.g., by the demetallizing process of U.S. Pat. No. 4,686,197).

Any suitable solution of lactic acid can be employed as treating agent (a). Generally, agent (a) is an aqueous solution comprising (preferably consisting essentially of) water and lactic acid. The solution can contain lactic acid in any effective concentration, preferably about 0.001 to about 10 mol/l, more preferably about to about 0.5 to about 10 mol/l. When an aqueous lactic acid solution is used, the pH generally is below about 3, preferably about 0.5-2. Antimony and/or fluorine compounds are essentially absent from the lactic acid solution.

Non-limiting examples of contacting agent (b1) include solutions of calcium chloride, calcium nitrate (preferred), calcium hydroxide, calcium bicarbonate, calcium carboxylates (such as Ca acetate) and the like. Non-limiting examples of dissolved tin compounds and dissolved phosphorous compounds, respectively, which can be employed as components of treating agent (b2) are those disclosed in U.S. Pat. No. 4,321,129 and U.S. Pat. No. 4,321,128, respectively. Non-limiting examples of suitable tin compounds include tin chloride, tin nitrate, tin carboxylates, tetraalkyltin (preferably tetra-n-butyltin), and the like. Non-limiting examples of suitable phosphorous compounds include phosphoric acids (such as $H_3PO_4$), ammonium hydrogen phosphates (such as $NH_4H_2PO_4$), ammonium phosphate, phosphorous acid, ammonium hydrogen phosphites, ammonium phosphite, alkyl phosphines, aryl phosphines (preferably p-tolyldiphenyl phosphine), esters of phosphoric or phosphorus acid, and the like. Inorganic compounds of Ca, Sn and P are generally dissolved in water for contacting with the spent cracking catalyst, whereas organic compounds of Sn and P are generally dissolved in an organic hydrocarbon such as n-heptane, toluene, and the like. These inorganic or organic compounds do not contain Sb, Bi or P.

The contacting of the spent zeolite-containing catalyst composition with (a) dissolved lactic acid and either (b1) at least one dissolved calcium compound or, alternatively, (b2) dissolved tin and phosphorous compounds can be carried out in any suitable manner, either substantially simultaneously or sequentially, in a batch process (such as in a vessel equipped with agitation means) or (preferably continuously). Preferably, treating solutions are passed through a column filled with a spent cracking catalyst composition. If the reactivation process of this invention is carried out sequentially, the spent catalyst composition is first contacted with agent (a) and then with agent (b1) or, alternatively, with agent (b2). In this mode of operation, the first treating solution preferably consists essentially of lactic acid and water, and the second treating solution (preferably aqueous) comprises agent (b1) or, alternatively, combination agent (b2). However, if the reactivation process is carried out by essentially simultaneous contacting of the spent catalyst composition with agent (a) and either agent (b1) or, alternatively, combination agent (b2), the treating solution (preferably aqueous) generally contains all required treating agents, i.e., lactic acid and either at least one calcium compound or, alternatively, both at least one tin compound and at least one phosphorus compound.

In each phase of the contacting operation, any suitable time of contact between the dissolved treating agents and the spent cracking catalyst composition can be employed, generally from about 0.05 to about 5 hours (preferably about 5-30 minutes). Any suitable temperature can be employed in the contacting operations, generally from about 1° C. to about 100° C. (preferably about 20°-99° C.), generally at ambient pressure (1 atm). Generally, the weight ratio of the lactic acid containing solution to the spent cracking catalyst is in the range of from about 2:1 to about 100:1; preferably about 4:1 to about 20:1.

Generally, the thus-reactivated catalyst composition is at least partially (preferably substantially) separated from the employed treating solutions (preferably aqueous). Any suitable separating means can be employed. Non-limiting examples of suitable solid/liquid separation means are filtration, centrifugation, settling and subsequent draining or decantation of the liquid, and the like. Preferably, the at least partially separated, treated catalyst composition is washed with a suitable liquid (preferably water). Generally, the temperature of the wash liquid (preferably water) is about 100°-212° F. preferably about 180°-210° F. This washing step may enhance the removal of contaminant metals (in particular vanadium) from the catalytic cracking catalyst composition. Preferred washing conditions can easily be determined by those skilled in the art. The thus-washed catalyst composition can be dried, so as to substantially remove adhered water therefrom. Preferred drying conditions comprise a temperature of about 80°-120° C., at atmospheric pressure conditions, and a drying time of about 0.5-10 hours.

In one embodiment of this invention, the spent cracking catalyst composition is first treated with dissolved lactic acid and then contacted (generally by impregnation or spraying) with a second solution of at least one calcium compound in a suitable liquid medium (such as water) so as to incorporate into the acid-treated spent catalyst composition an effective passivating amount of calcium. Any effective concentration of the calcium compound(s) in the second solution can be applied (preferably about 0.01-0.5 mol/l Ca). Any suitable weight ratio of the calcium compound(s) to the lactic acid-treated spent cracking catalyst composition can be applied in this treatment step, but preferably this weight ratio is in the range of from about 0.00001:1 to about 0.04:1, more preferably in the range of from about 0.0001:1 to about 0.01:1. Generally, the contacting with at least one Ca compound is carried out at any suitable temperature, preferably, at a temperature of about 10° to about 99° C. Preferably, this treatment with at least one Ca compound is followed by a drying step (preferably in air or an inert gas such as $N_2$, for about 0.2–10 hours, at a temperature of about 100° to about 150° C.) and, optionally, a calcining step (preferably at a temperature of about 450° to about 750° C., for about 0.2–10 hours, in air or an inert gas such as $N_2$). Any suitable effective total level of Ca in the lactic acid-treated spent catalytic cracking catalyst composition can be attained. Generally, this level is in the range of from about 0.001 to about 4 weight-% Ca, based on the weight of the substantially dry material. Preferably, this level is about 0.01–1 weight-% Ca.

In another preferred embodiment, the above-described treatment with at least one Ca compound is replaced with a treatment employing at least one dissolved tin compound and at least one dissolved phosphorous compound, either simultaneously (i.e., with one solution containing both Sn and P compounds) or sequentially (i.e., first with a solution of at least one tin compound and then with at least one phosphorous compound, or vice versa). Any effective concentration of Sn and P in the treating solution(s) can be employed, preferably about 0.01–0.5 mol/l Sn and about 0.01–0.5 mol/l P. The conditions of the treatment with Sn and P compounds are essentially the same as those described for treatment with at least one dissolved Ca compound, except that these compounds are generally dissolved in a liquid hydrocarbon. Preferably, the treatment with dissolved Sn and P compounds is followed by a drying step and, optionally, a calcining step, wherein the conditions of these steps are essentially the same as those described for the drying and calcining steps following treatment with dissolved Ca compound(s). Generally, this treatment with Sn and P compounds is carried out at such conditions as to attain levels of the Sn and P in the reactivated catalyst of about 0.001 to about 4 (preferably about 0.01–1) weight-% of Sn and about 0.0005–2 (preferably about 0.005–0.5) weight-% P.

The reactivated cracking catalyst composition obtained in the above-described reactivation process of this invention can be used in any suitable catalytic cracking process, i.e., a process for catalytically cracking hydrocarbon-containing oil feedstocks in any suitable cracking reactor (e.g., in a FCC reactor or in a Thermofor moving bed reactor), essentially in the absence of added hydrogen gas. The reactivated catalyst composition obtained by any of the above-described reactivation methods can be used alone or in admixture with fresh (unused) zeolite-containing catalyst composition in catalytic cracking processes.

The hydrocarbon-containing feed stream for the catalytic cracking process of this invention can be any suitable feedstock. Generally, the feed has an initial boiling point (ASTM D 1160) in excess of about 400° F., preferably a boiling range of from about 400° to about 1200° F., more preferably a range of from about 500° to about 1100° F., measured at atmospheric pressure conditions. The API gravity (measured at 60° F.) generally is in the range of from about 5 to about 40, preferably from about 10 to about 35. Generally, these feedstocks contain Ramsbottom carbon residue (ASTM D 524; usually about 0.1–20 weight-%), sulfur (generally about 0.1–5 weight-% S), nitrogen (generally about 0.05–2 weight-% N), nickel (generally about 0.05–30 ppm Ni, i.e., parts by weight of Ni per million parts by weight of feed), vanadium (generally about 0.1–50 ppm V) and copper (generally about 0.01–30 ppm Cu). Non-limiting examples of suitable feedstocks are light gas oils, heavy gas oils, vacuum gas oils, cracker recycle oils (cycle oils), residua (such as distillation bottoms fractions), and hydrotreated residua (e.g., hydrotreated in the presence of Ni, Co, Mo-promoted alumina catalysts), liquid coal pyrolyzates, liquid products from extraction or pyrolysis of tar sand, shale oils, heavy fractions of shale oils, and the like. The presently most preferred feedstocks are heavy gas oils and hydrotreated residua.

Any suitable reactor can be used for the catalytic cracking process of this invention. Generally, a fluidized-bed catalytic cracking (FCC) reactor (preferably containing one or more risers) or a moving-bed catalytic cracking reactor (e.g., a Thermofor catalytic cracker) is employed, preferably a FCC riser cracking unit. Examples of such FCC cracking units are described in U.S. Pat. Nos. 4,377,470 and 4,424,116. Generally, a catalyst regeneration unit (for removal of coke deposits) is combined with the FCC cracking unit, as is shown in the above-cited patents.

Specific operating conditions of the cracking operation depend greatly on the type of feed, the type and dimensions of the cracking reactor and the oil feed rate. Examples of operating conditions are described in the above-cited patents and in many other publications. In an FCC operation, generally the weight ratio of catalyst composition to oil feed (i.e., hydrocarbon-containing feed) ranges from about 2:1 to about 10:1, the contact time between oil feed and catalyst is in the range of from about 0.2 to about 2.0 seconds, and the cracking temperature is in the range of from about 800° to about 1200° F. Generally, steam is added with the oil feed to the FCC reactor so as to aid in the dispersion of the oil as droplets. Generally, the weight ratio of steam to oil feed is in the range of from about 0.05:1 to about 0.5:1.

The separation of the thus used cracking catalyst composition from gaseous and liquid cracked products and the separation of cracking products into various gaseous and liquid product fractions can be carried out by any conventional separation means. The most desirable product fraction is gasoline (ASTM boiling range: about 180°–400° F.). Non-limiting examples of such separation schemes are shown in "Petroleum Refining" by James H. Gary and Glenn E. Handwerk, Marcel Dekker, Inc., 1975.

Generally, the separated, used cracking catalysts are regenerated, preferably by steam stripping for removal of adhered oil and subsequent heating under oxidizing conditions so as to burn off carbon deposits. At least a portion of the regenerated cracking catalyst composition can then be treated by the reactivation process of this invention, and thereafter be recycled to the catalytic cracking reactor, generally in admixture with fresh (unused) cracking catalyst.

The following examples are presented to further illustrate this invention and are not to be considered as unduly limiting the scope of this invention.

EXAMPLE I

This example illustrates the reactivating treatment of a metal-contaminated equilibrium cracking catalyst composition with dissolved lactic acid and/or dissolved calcium nitrate.

The equilibrium cracking catalyst composition was a blend of fresh cracking catalyst and of spent cracking catalyst (having been used and regenerated in a FCC cracking operation at a refinery of Phillips Petroleum Company). This equilibrium catalyst composition (labeled "J-8802") contained about 10 weight-% zeolite, which was embedded in a silica-alumina matrix, 0.18 weight-% Ni, 0.32 weight-% V, 0.53 weight-% Fe, 0.01 weight-% Cu, 0.06 weight-% Sb, and 0.34 weight-% Na. "J-8802" had a surface area of about 110 m²/g, a total pore volume of 0.18 cc/g, an apparent bulk density of 0.90 g/cc, and a zeolite unit cell size of 24.36 Å.

Catalyst A (Control) was prepared by heating 500 grams of equilibrium catalyst J-8802 with about 3.37 Kg of an aqueous solution containing about 47 weight-% lactic acid under reflux conditions for about 20 minutes. The pH of the solution was 1.1. The thus-treated catalyst was separated from the acid solution by filtration, washed three times with 2–2.5 liters of water, and dried for about 1 hour at 120° C.

Catalyst B (Control) was prepared by impregnating 40 grams of equilibrium catalyst J-8802 with 20.1 g of an aqueous solution containing 0.08 g Ca(NO$_3$)$_2$, followed by drying for 1 hour at 120° C. Catalyst B contained about 0.09 weight-% Ca.

Catalyst C (Invention) was prepared in the same manner as Catalyst B, except that Catalyst A was used in lieu of J-8802 as the starting material. Thus, Catalyst C had been treated sequentially with lactic acid and Ca(NO$_3$)$_2$. Catalyst C contained about 0.09 weight-% Ca.

The above-described catalysts were tested in an MCBU (microconfined bed unit) cracking test reactor, substantially in accordance with the procedure of Example II of U.S. Pat. No. 4,794,095. Cracking test conditions comprised a temperature of about 950° F. and a catalyst to oil weight ratio of 6:1. The oil feed was a hydrotreated residuum having an API gravity (at 60° F.) of 18.7, a sulfur content of 0.53 weight-%, a basic nitrogen content of 0.09 weight-%, a Conradson carbon content of 6.7 weight-%, a nickel content of 10.6 ppm and a vanadium content of 12.7 ppm. Most pertinent test results for each catalyst are summarized in Table I.

TABLE I

| Catalyst | Conversion (Wt-% of Feed) | Gasoline Yield[1] | Hydrogen Generation[2] |
|---|---|---|---|
| J-8802 (untreated) | 77 | 50 | 388 |
| A (treated with lactic acid) | 80 | 52 | 385 |
| B (treated with Ca nitrate) | 77 | 50 | 441 |
| C (treated with lactic acid and Ca nitrate) | 81 | 52 | 355 |

[1]weight-% of converted feed
[2]standard cubic feet H$_2$ per barrel of converted feed
[3]coke formation was 12–13 weight-%, based on the weight of the converted feed, in all runs Test data in Table I show that treatment of a metal-contaminated cracking catalyst with dissolved Ca(NO$_3$)$_2$ alone (Catalyst B) was ineffective (in terms of increasing conversion and gasoline yield and in lowering hydrogen generation). Thus, it was most surprising that the beneficial effects attained by lactic acid treatment alone (Catalyst A) were enhanced by the subsequent treatment with dissolved Ca(NO$_3$)$_2$ (Catalyst C).

EXAMPLE II

This example illustrates the rejuvenation of a spent equilibrium cracking catalyst by treatment with dissolved lactic acid and with dissolved phosphorous and/or tin compounds.

Catalyst D (Control) was prepared by impregnating 40 grams of Catalyst A (described above, i.e., J-8802 which had been treated with dissolved lactic acid) with a solution of 0.09 g of p-tolyldiphenylphosphine in 18 g of toluene, followed by drying for 1 hour at 120° C.). Catalyst D contained about 0.025 weight-% P.

Catalyst E (Control) was prepared by impregnating 40 grams of Catalyst A with a solution of 0.114 g of tetra-n-butyltin in 20 g n-heptane, followed by drying for 1 hour at 120° C. Catalyst E contained about 0.098 weight-% Sn.

Catalyst F (Invention) was prepared in accordance with the procedure for Catalyst D, except that Catalyst E was used as the starting material in lieu of Catalyst A. Thus, Catalyst F was sequentially treated with lactic acid, tetra-n-butyltin and finally with p-tolyldiphenylphosphine. Catalyst F contained 0.098 weight-% Sn and 0.025 weight-% P.

Results of cracking tests for the above-described catalysts (carried out substantially in accordance with the testing procedure described in Example I), are summarized in Table II.

TABLE II

| Catalyst | Conversion (Wt-% of Feed) | Gasoline Yield | Hydrogen Generation |
|---|---|---|---|
| J-8802 (Untreated) | 77 | 50 | 388 |
| A (treated with lactic acid) | 80 | 52 | 385 |
| D (treated with lactic acid + P compound) | 80 | 51 | 375 |
| E (treated with lactic acid + Sn compound) | 80 | 52 | 369 |
| F (treated with lactic acid + Sn and P compounds) | 80 | 52 | 333 | see footnotes 1, 2, and 3 in Table I.

Test data in Table II show that a significant reduction in H$_2$ generation was achieved (versus treatment with lactic acid and a phosphorus compound; Catalyst D) by subsequent treatment with a dissolved tin compound (Catalyst F). This effect is unexpected because treatment with dissolved lactic acid and a tin compound alone (Catalyst E) had only a slightly beneficial effect on the hydrogen generation.

Reasonable variations, modifications and adaptations for various conditions and uses can be made within the scope of the disclosure and appended claims.

That which is claimed is:

1. A process for reactivating a spent cracking catalyst composition comprising the step of contacting a spent zeolite-containing catalytic cracking catalyst composition which contains at least one metal contaminant selected from the group consisting of nickel compounds and vanadium compounds with an aqueous solution comprising both dissolved lactic acid and at least one dissolved calcium compound;

wherein said catalyst reactivation process produces a reactivated catalytic cracking catalyst composition exhibiting lower hydrogen generation, when employed in catalytic cracking of a hydrocarbon-containing oil, than said spent zeolite-containing catalytic cracking catalyst composition; wherein said aqueous solutions is essentially free of antimony, bismuth and fluorine and contains about 0.001–10 mol/l of lactic acid; and wherein about 0.01–1 weight-% of calcium has been incorporated into said reactivated catalytic cracking catalyst composition.

2. A process in accordance with claim 1, wherein said aqueous solution contains about 0.5–10 mol/l lactic acid and about 0.01–0.5 mol/l Ca.

3. A process in accordance with claim 2, wherein said contacting of said aqueous solution with said spent catalytic cracking catalyst composition is carried out at a weight-ratio of said aqueous solution to said spent catalytic cracking catalyst composition of about 2:1 to about 100:1.

4. A process in accordance with claim 1, comprising the additional steps of drying said reactivated catalytic cracking catalyst composition and then calcining it at a temperature of about 450°–750° C.

5. A process in accordance with claim 1, wherein said spent zeolite-containing catalytic cracking catalyst composition comprises about 0.01–2.0 weight-% Ni and about 0.01–2.0 weight-% V.

6. A process for reactivating a spent cracking catalyst composition comprising the steps of contacting a spent zeolite-containing catalytic cracking catalyst composition which contains at least one metal contaminant selected from the group consisting of nickel compounds and vanadium compounds sequentially with a first aqueous solution comprising dissolved lactic acid and then with a second aqueous solution comprising at least one dissolved calcium compound;

wherein said catalyst reactivation process produces a reactivated catalytic cracking catalyst composition exhibiting lower hydrogen generation, when employed in catalytic cracking of a hydrocarbon-containing oil, than said spent zeolite-containing catalytic cracking catalyst composition; wherein said first and second aqueous solutions are essentially free of antimony, bismuth and flourine; wherein said first aqueous solution contains about 0.001–10 mol/l of lactic acid; and wherein about 0.01–1 weight-% of calcium has been incorporated into said reactivated catalytic cracking catalyst composition.

7. A process in accordance with claim 6, wherein said first aqueous solution contains about 0.5–10 mol/l lactic acid, and said second aqueous solution contains about 0.01–0.5 mol/l Ca.

8. A process in accordance with claim 7, wherein the weight ratio of said first solution to said spent cracking catalyst composition is about 2:1 to about 100:1.

9. A process in accordance with claim 6, wherein said spent zeolite-containing catalytic cracking catalyst composition comprises about 0.01–2.0 weight-% Ni and about 0.01–2.0 weight-% V.

10. A process in accordance with claim 6 comprising the additional steps of drying said reactivated catalytic cracking catalyst composition and then calcining it at a temperature of about 450°–750° C.

11. A process for reactivating a spent cracking catalyst composition comprising the step of contacting a spent zeolite-containing catalytic cracking catalyst composition which contains at least one metal contaminant selected from the group consisting of nickel compounds and vanadium compounds with an aqueous solution comprising dissolved lactic acid, at least one dissolved tin compound and at least one dissolved phosphorus compound;

wherein said catalyst reactivation process produces a reactivated catalytic cracking catalyst composition exhibiting lower hydrogen generation, when employed in catalytic cracking of a hydrocarbon-containing oil, than said spent zeolite-containing catalytic cracking catalyst composition; wherein said aqueous solution is essentially free of antimony, bismuth and fluorine and contains about 0.001–10 mol/l of lactic acid; and wherein about 0.001–4 weight-% of tin and about 0.0005–2 weight-% of phosphorus have been incorporated into said reactivated catalytic cracking catalyst composition.

12. A process in accordance with claim 11 wherein said aqueous solution contains about 0.5–10 mol/l lactic acid, about 0.01–0.5 mol/l Sn and about 0.01–0.5 mol/l P.

13. A process in accordance with claim 12, wherein said contacting of said aqueous solution with said spent catalytic cracking catalyst composition is carried out at a weight-ratio of said aqueous solution to said spent catalyst composition of about 2:1 to about 100:1.

14. A process in accordance with claim 11, wherein said spent zeolite-containing catalytic cracking catalyst composition comprises about 0.01–2.0 weight-% Ni and about 0.01–2.0 weight-% V.

15. A process in accordance with claim 11 comprising the additional steps of drying said reactivated catalytic cracking catalyst composition and then calcining it at a temperature of about 450°–750° C.

16. A process for reactivating a spent catalyst composition comprising the steps of contacting a spent zeolite-containing catalytic cracking catalyst composition which contains at least one metal contaminant selected from the group consisting of nickel compounds and vanadium compounds sequentially with an aqueous solution comprising dissolved lactic acid and then with at least one other solution comprising at least one dissolved tin compound and at least one dissolved phosphorus compound;

wherein said catalyst reactivation process produces a reactivated catalytic cracking catalyst composition exhibiting lower hydrogen generation, when employed in catalytic cracking of a hydrocarbon-containing oil, than said spent zeolite-containing catalytic cracking catalyst composition; wherein said aqueous solution and said at least one other solution are essentially free of antimony, bismuth and fluorine; wherein said aqueous solution contains about 0.001–10 mol/l of lactic acid; and wherein about 0.001–4 weight-% of tin and about 0.0005–2 weight-% of phosphorus have been incorporated into said reactivated catalytic cracking catalyst composition.

17. A process in accordance with claim 16, wherein said aqueous solution contains about 0.5–10 mol/l lactic acid, and said at least one other solution contains about 0.01–0.5 mol/l Sn and about 0.01–0.5 mol/l P.

18. A process in accordance with claim 17, wherein the weight ratio of said aqueous solution to said spent catalyst composition is about 2:1 to about 100:1.

19. A process in accordance with claim 16, wherein said spent zeolite-containing catalytic cracking catalyst composition comprises about 0.01–2.0 weight-% Ni and about 0.01–2.0 weight-% V.

20. A process in accordance with claim 16 comprising the additional steps of drying said reactivated catalytic cracking catalyst composition and then calcining it at about a temperature of 450°–750° C.

21. A process in accordance with claim 16, wherein said at least one dissolved tin compound and said at least one dissolved phosphorus compound are calcined in two separate solutions.

* * * * *